(12) United States Patent
Chiesl

(10) Patent No.: US 6,770,505 B1
(45) Date of Patent: Aug. 3, 2004

(54) ARRANGEMENT FOR MEASURING PRESSURE ON A SEMICONDUCTOR WAFER AND AN ASSOCIATED METHOD FOR FABRICATING A SEMICONDUCTOR WAFER

(75) Inventor: Newell E. Chiesl, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/960,441

(22) Filed: Sep. 21, 2001

(51) Int. Cl.[7] ............................................. H01L 21/00
(52) U.S. Cl. ............................ 438/50; 438/48; 438/52
(58) Field of Search ............................ 438/50, 48, 52, 438/14, 53, 51, 15, 16, 17, 18, 4, 5, 6, 7, 8

(56) References Cited

U.S. PATENT DOCUMENTS

| | | | | |
|---|---|---|---|---|
| 4,771,638 A | * | 9/1988 | Sugiyama et al. | ............. 73/721 |
| 4,872,945 A | * | 10/1989 | Myers et al. | ............... 156/627 |
| 5,444,637 A | * | 8/1995 | Smesny et al. | ............. 364/556 |
| 5,450,754 A | * | 9/1995 | Biebl et al. | ................... 73/718 |
| 5,719,069 A | * | 2/1998 | Sparks | .......................... 437/59 |
| 6,378,378 B1 | * | 4/2002 | Fisher | .......................... 73/754 |
| 6,477,447 B1 | * | 11/2002 | Lin | ............................. 700/301 |
| 2001/0029152 A1 | * | 10/2001 | Moore | ........................... 451/41 |

* cited by examiner

Primary Examiner—Alexander Ghyka
(74) Attorney, Agent, or Firm—Maginot, Moore & Beck

(57) ABSTRACT

An arrangement for measuring pressure on a semiconductor wafer and an associated method for fabricating a semiconductor wafer are disclosed.

11 Claims, 15 Drawing Sheets

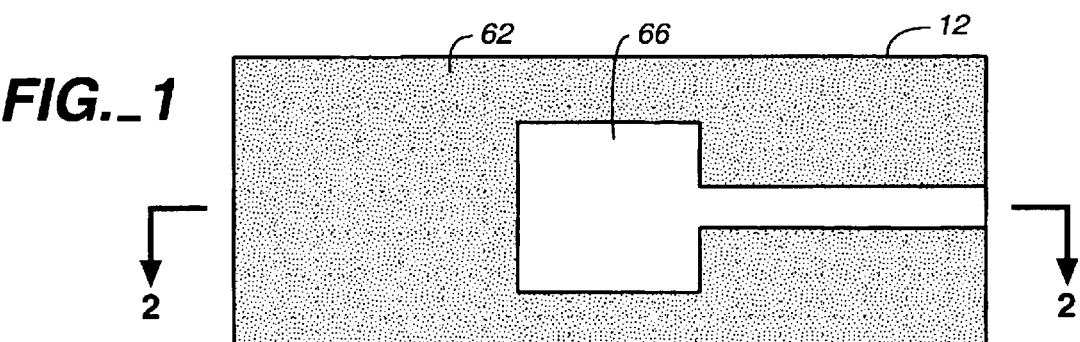
FIG._1
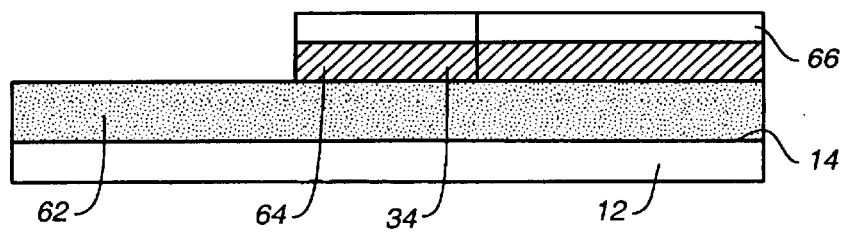
FIG._2
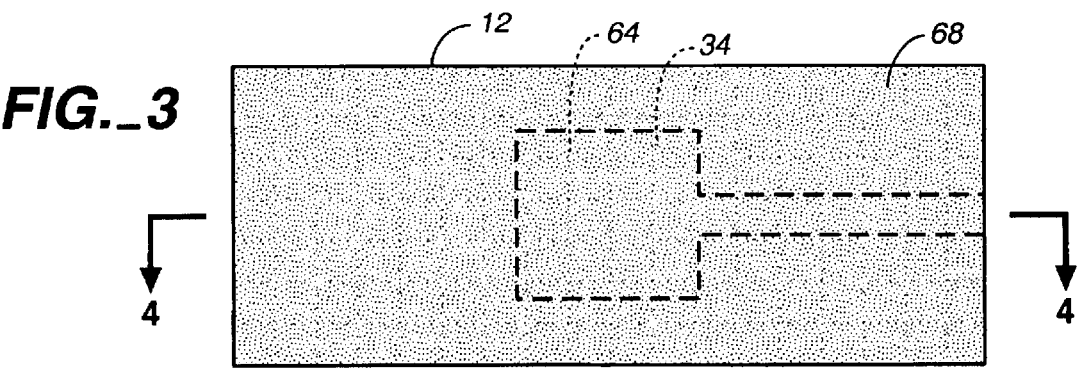
FIG._3
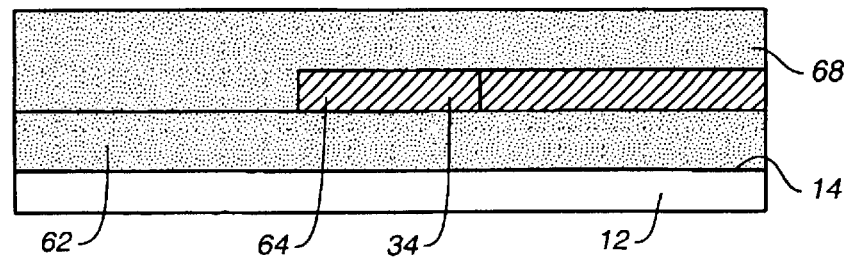
FIG._4

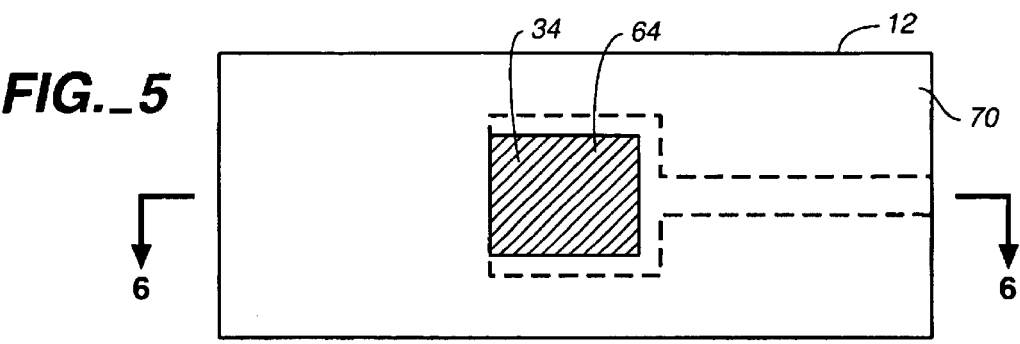
FIG._5
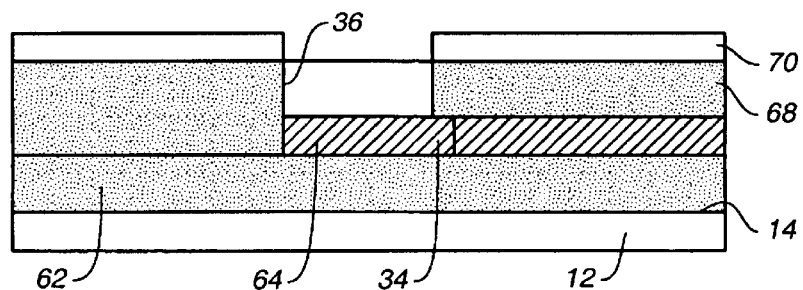
FIG._6
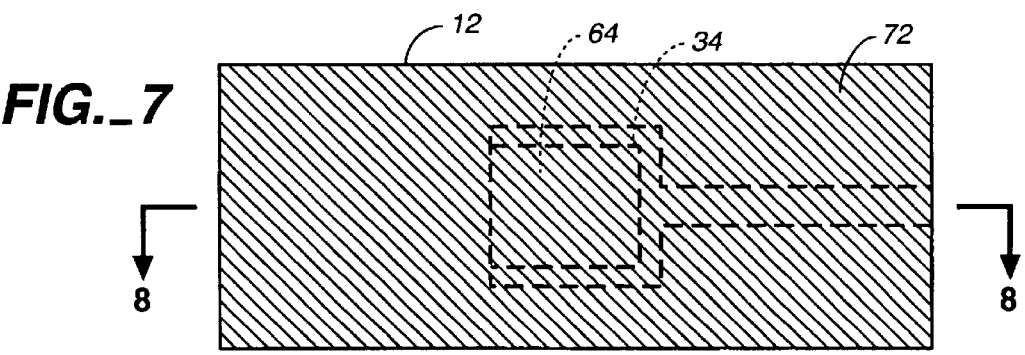
FIG._7
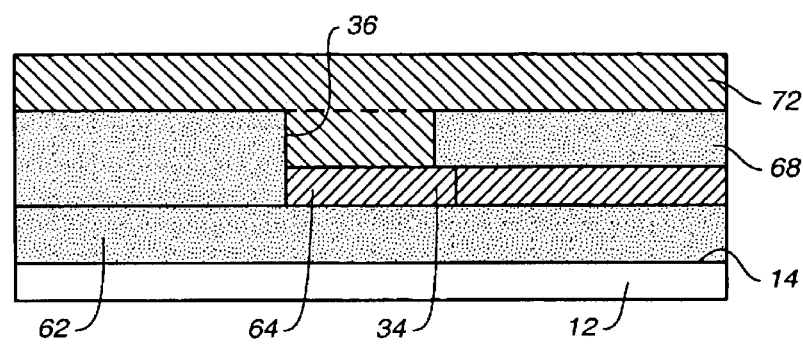
FIG._8

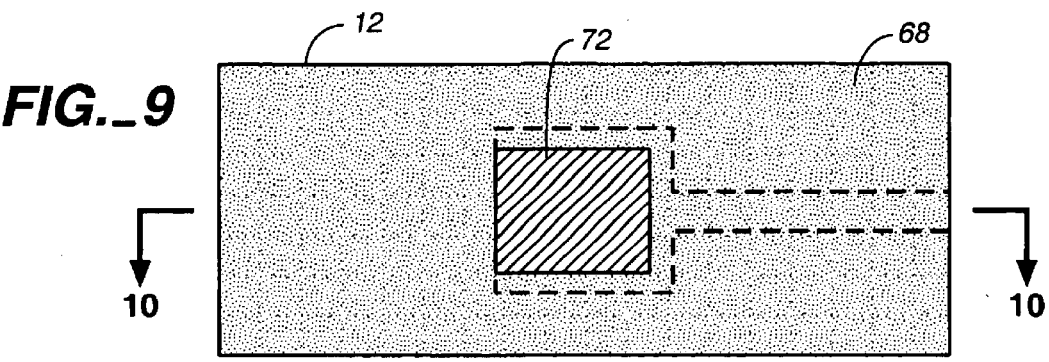
FIG._9
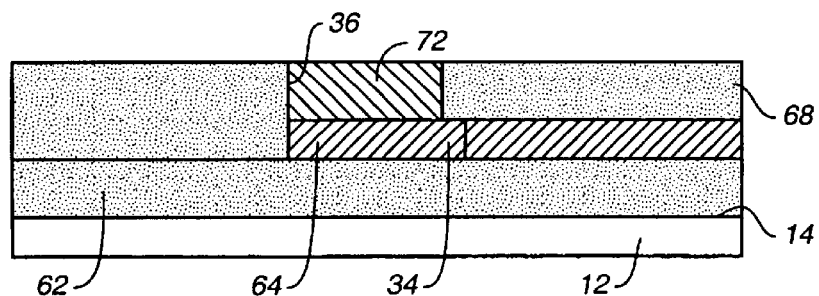
FIG._10
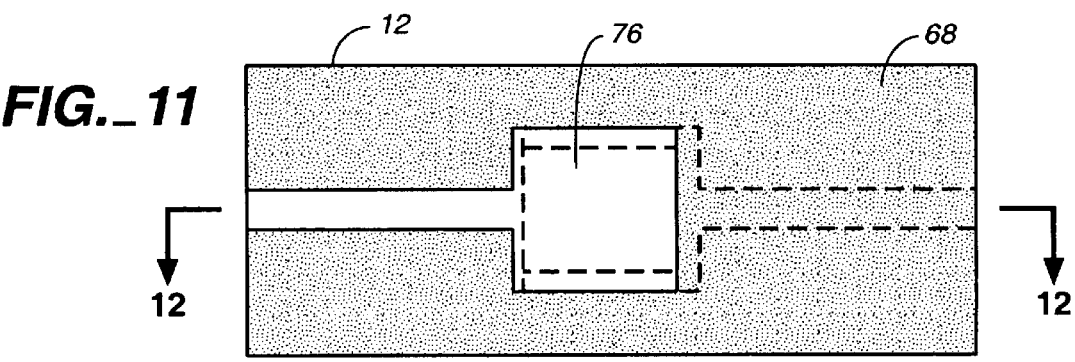
FIG._11
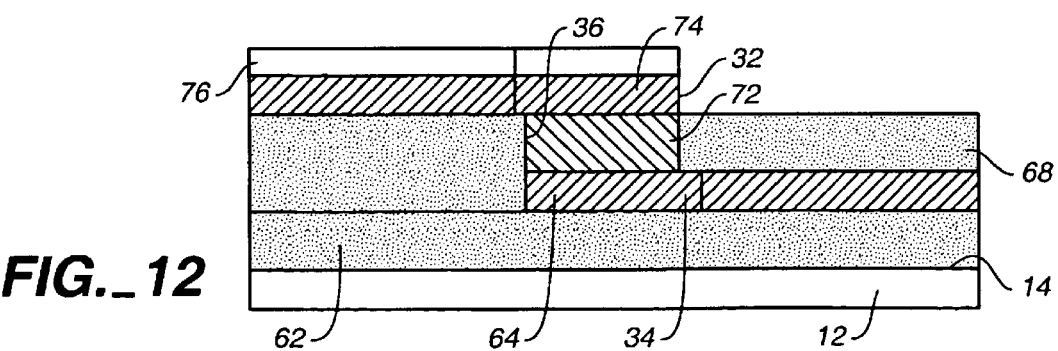
FIG._12

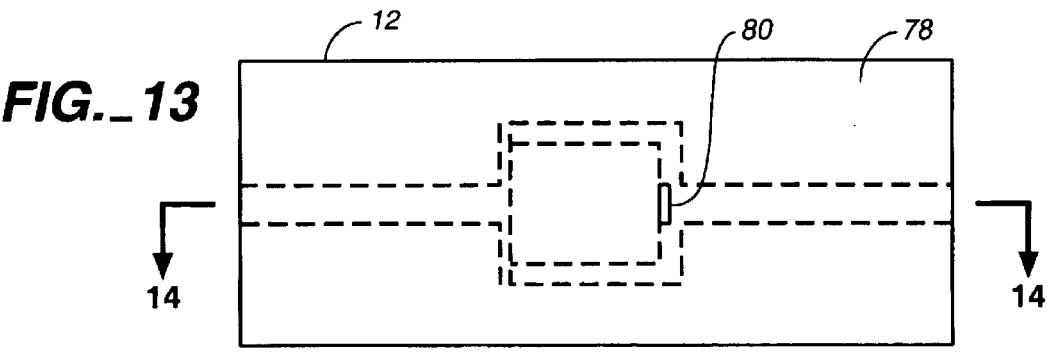
FIG._13
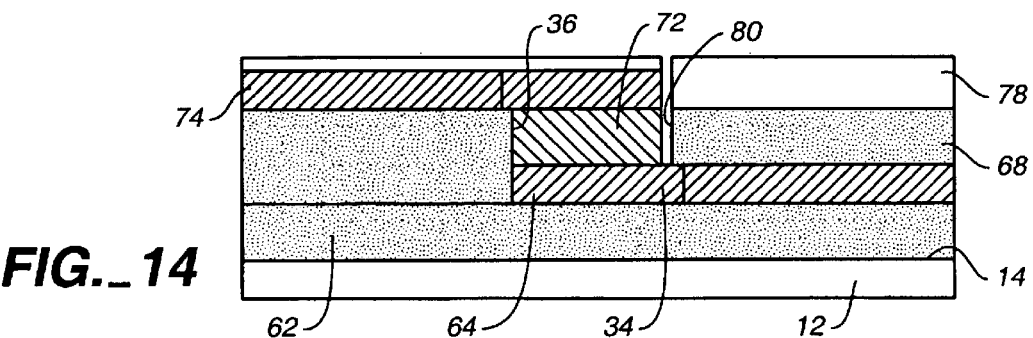
FIG._14
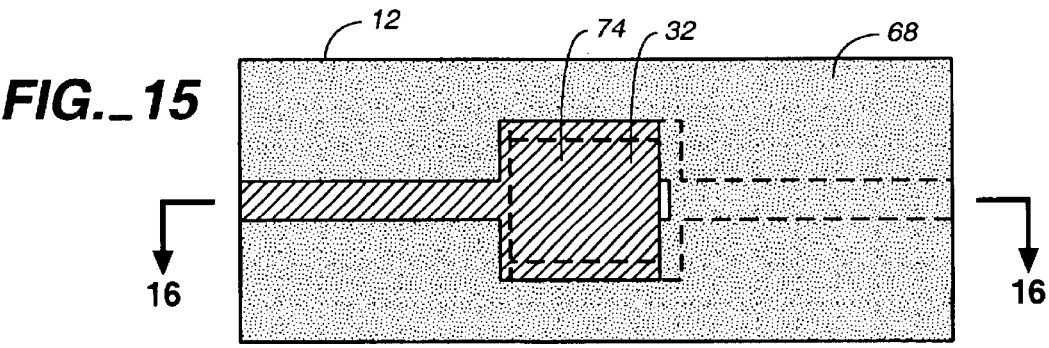
FIG._15
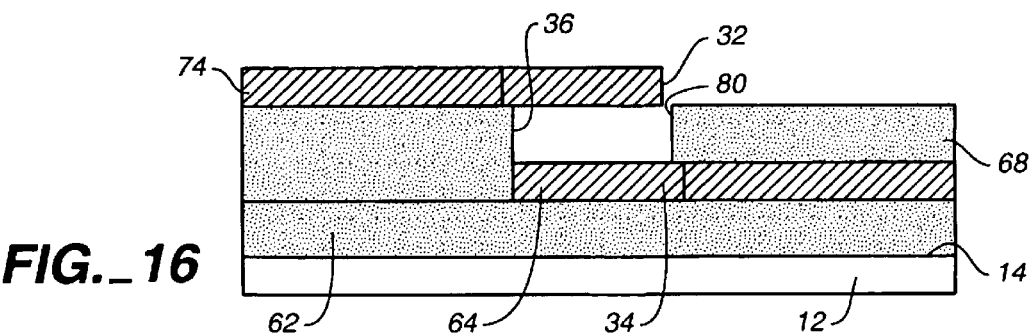
FIG._16

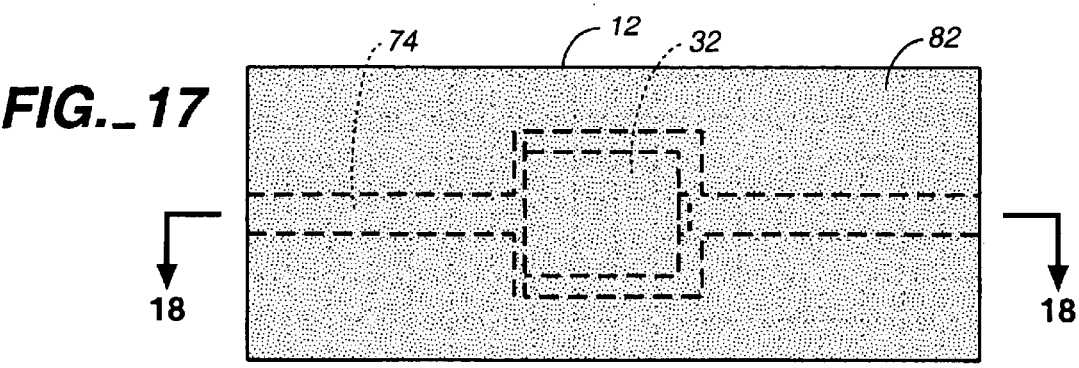
FIG._17
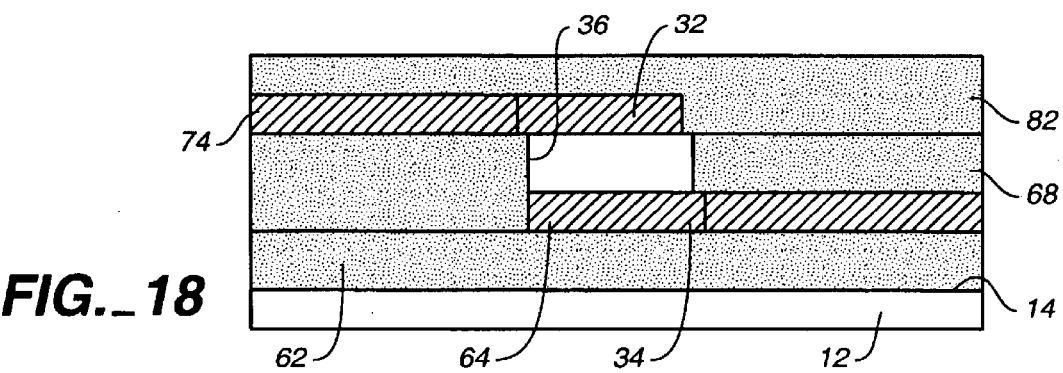
FIG._18
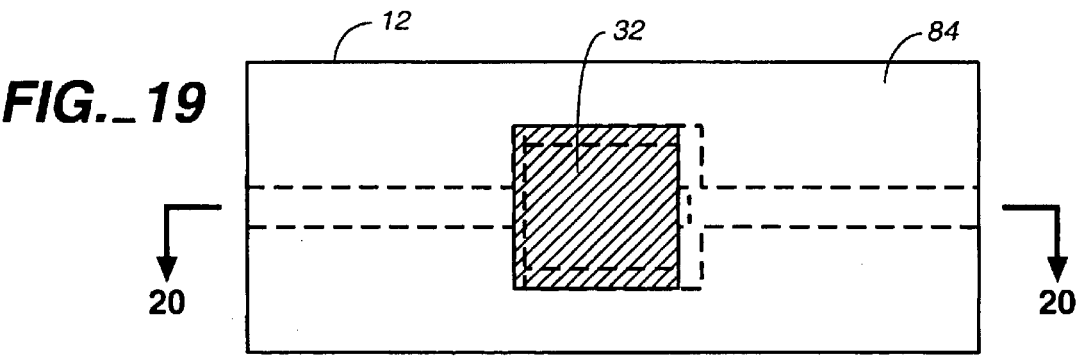
FIG._19
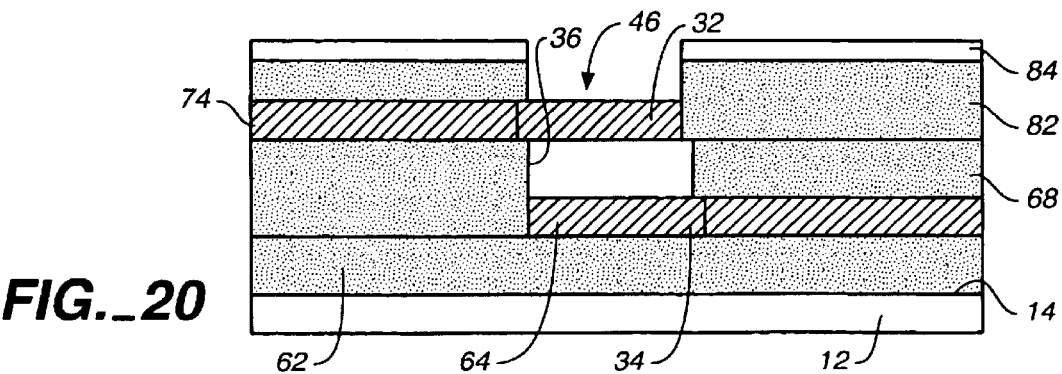
FIG._20

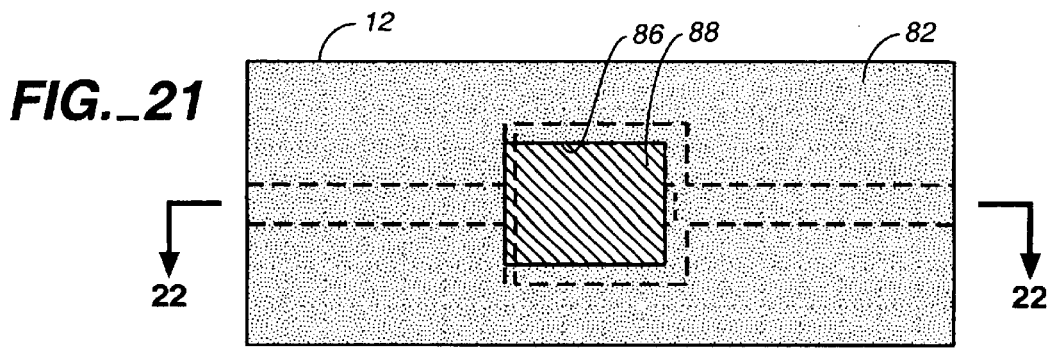
FIG._21
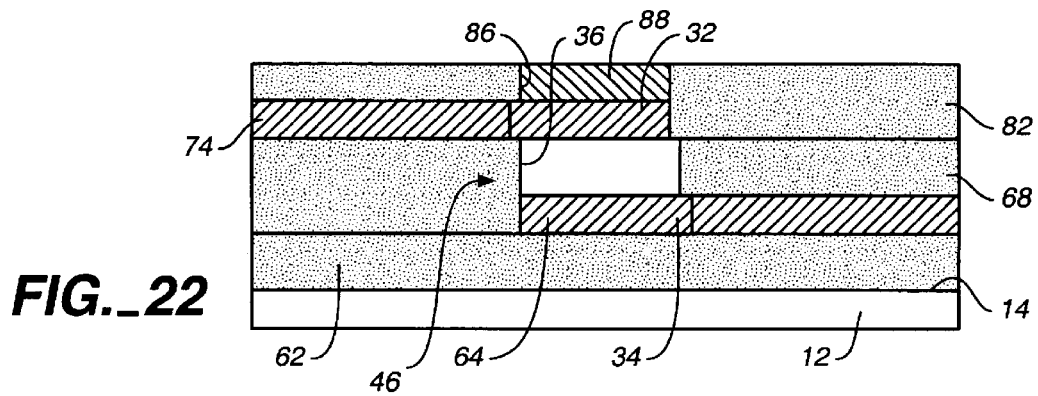
FIG._22
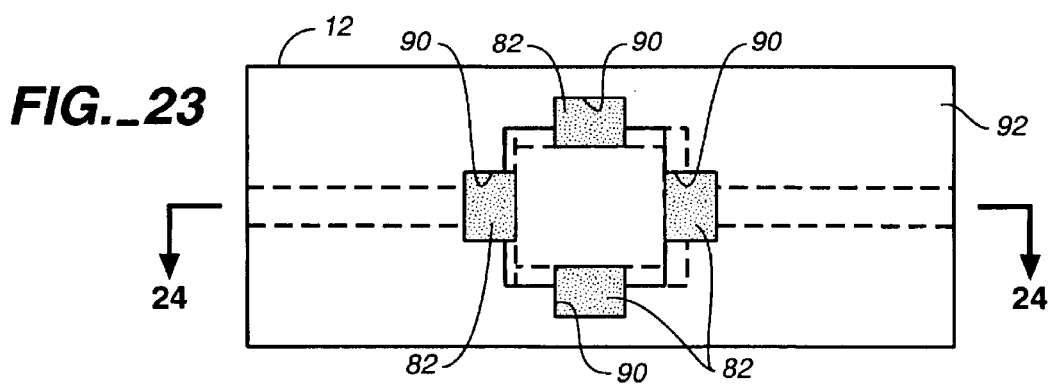
FIG._23
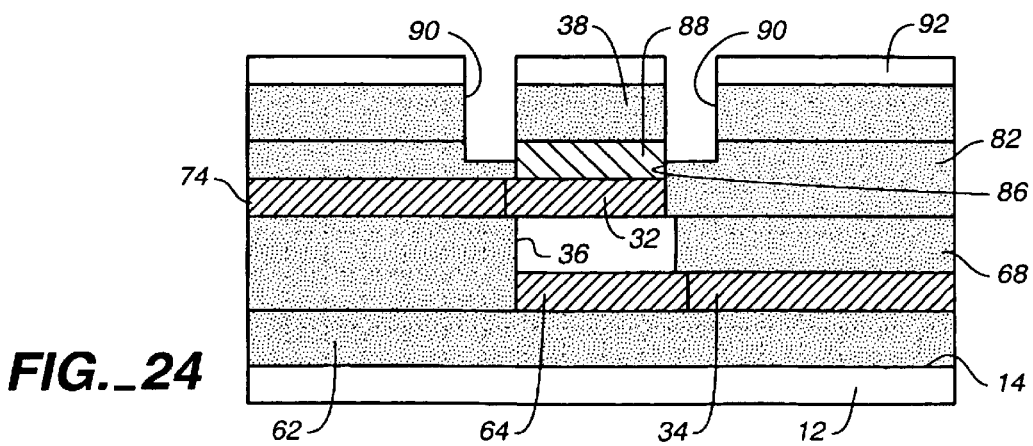
FIG._24

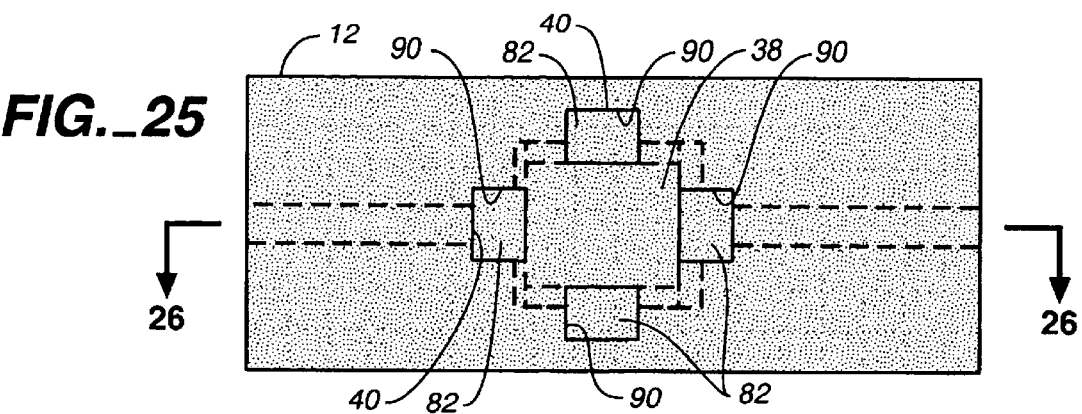
FIG._25
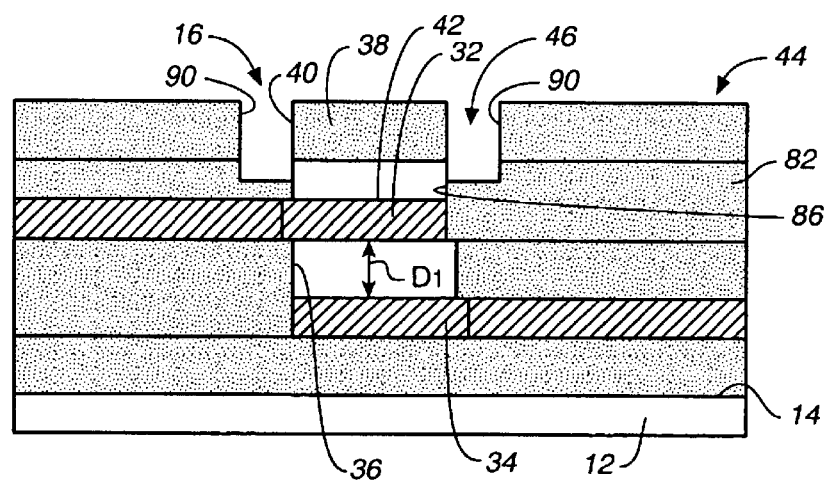
FIG._26

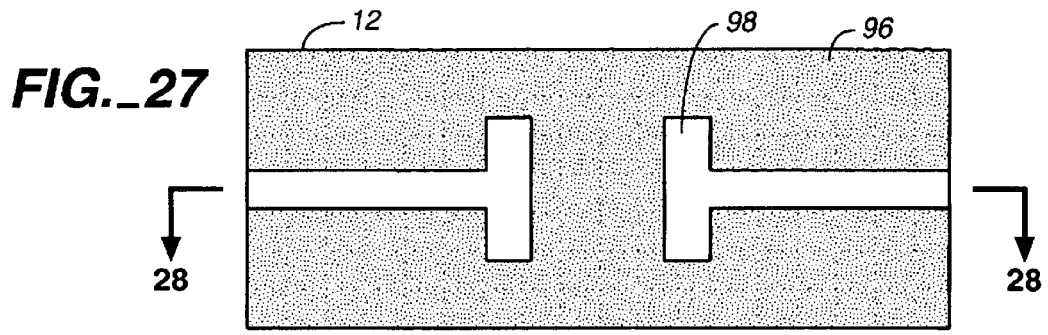
FIG._27
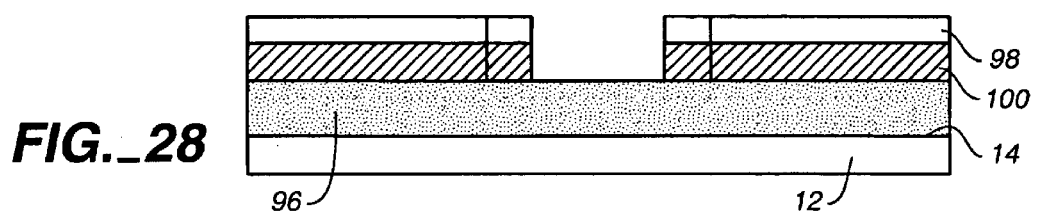
FIG._28
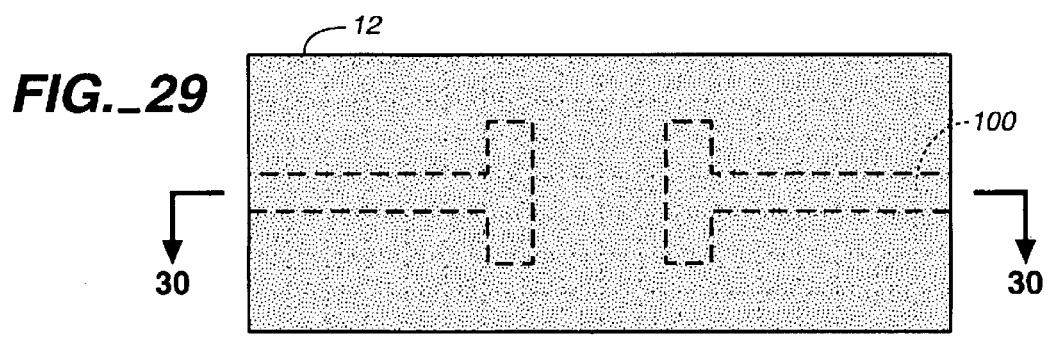
FIG._29
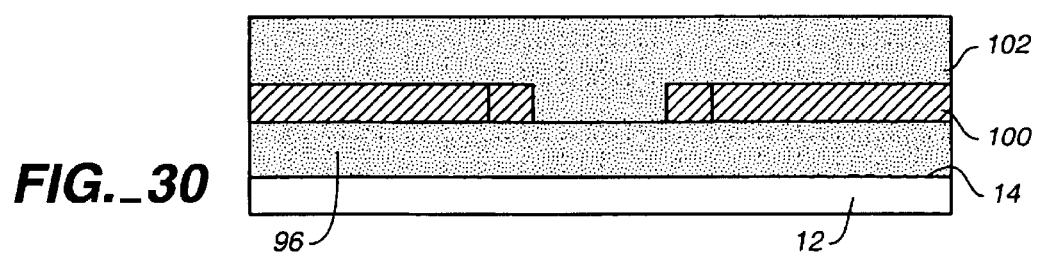
FIG._30

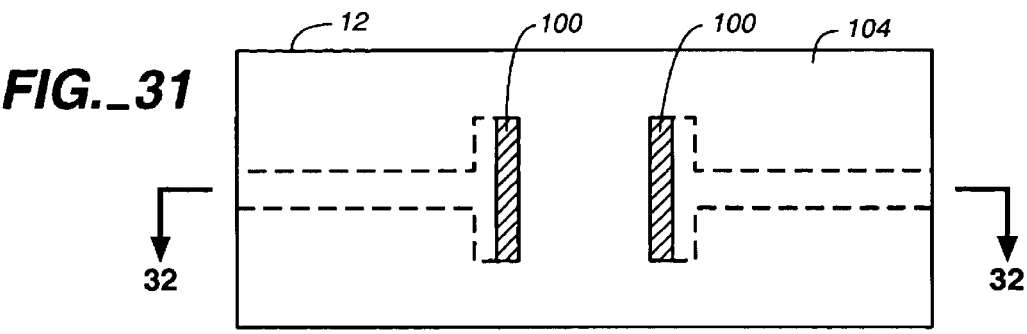
FIG._31
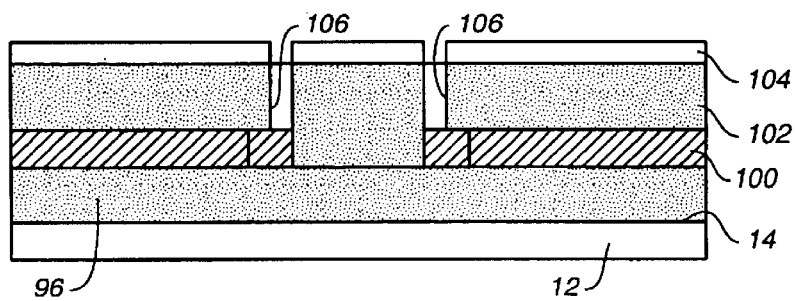
FIG._32
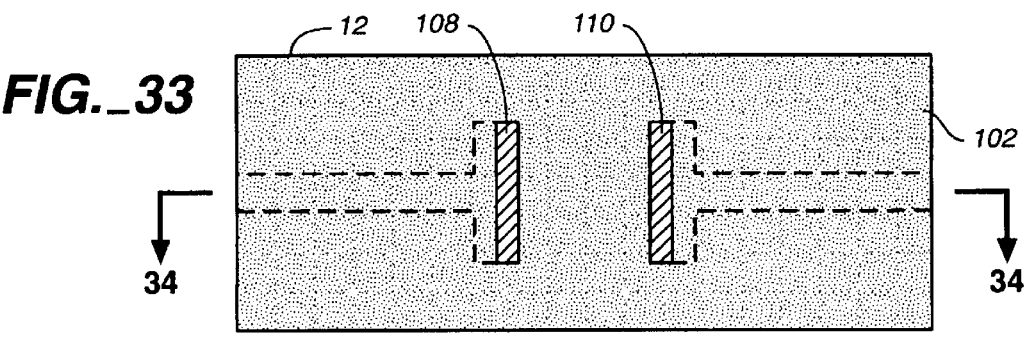
FIG._33
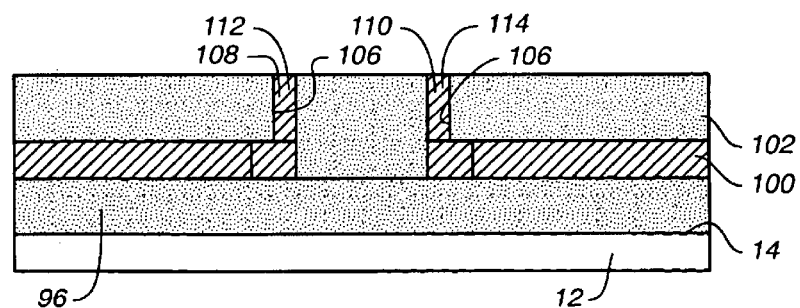
FIG._34

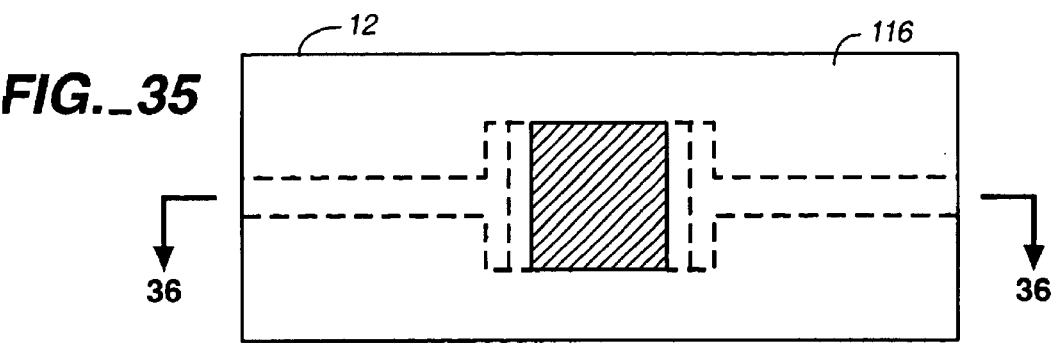
FIG._35
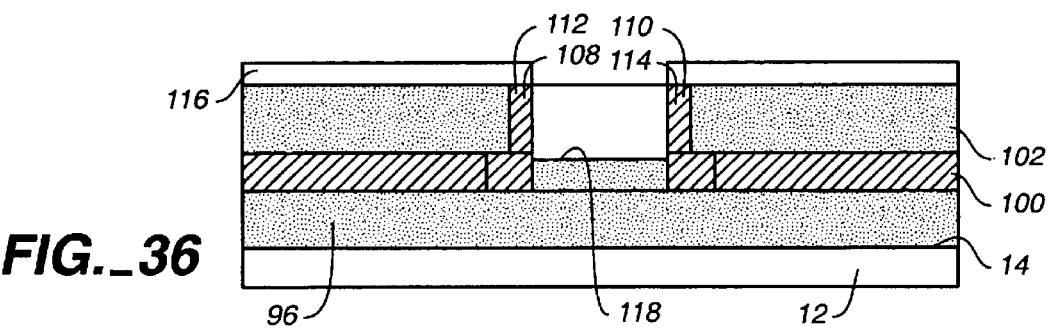
FIG._36
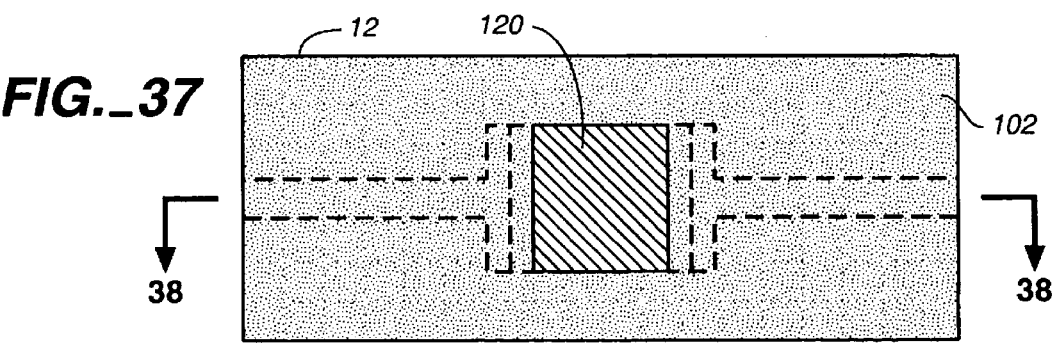
FIG._37
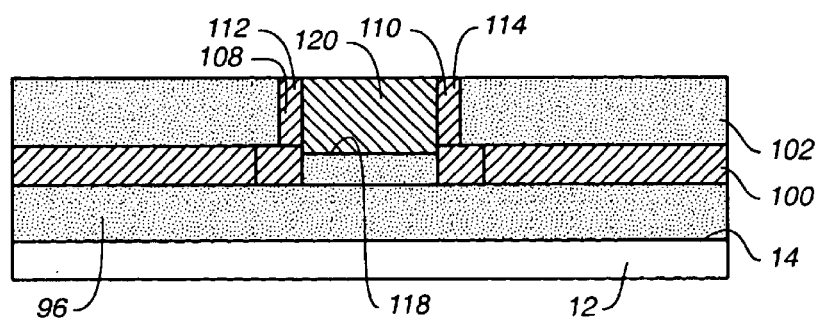
FIG._38

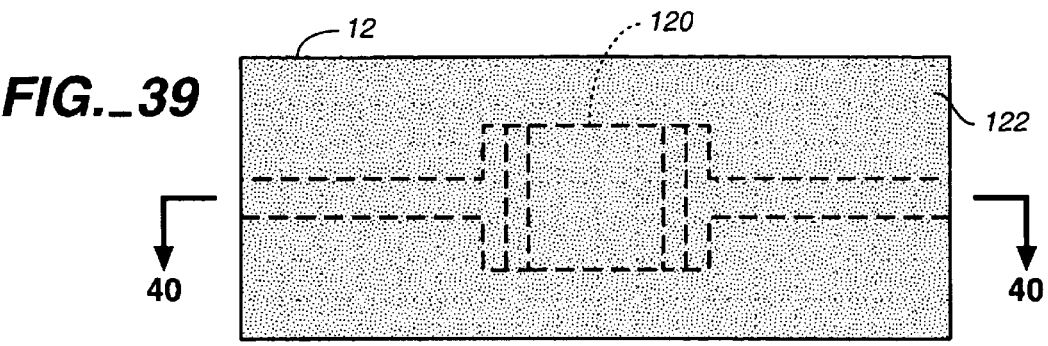
FIG._39
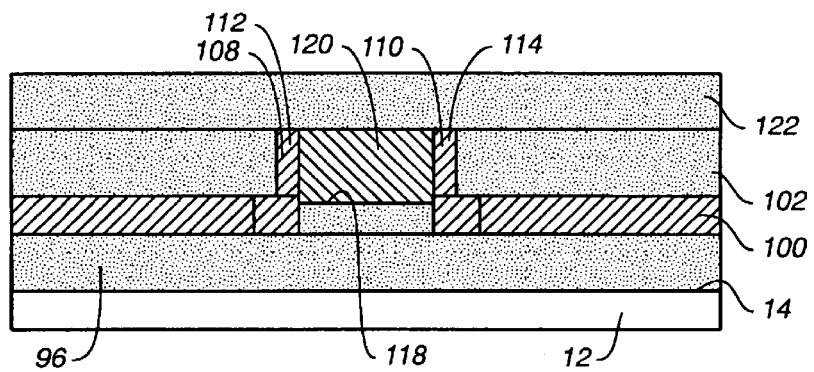
FIG._40
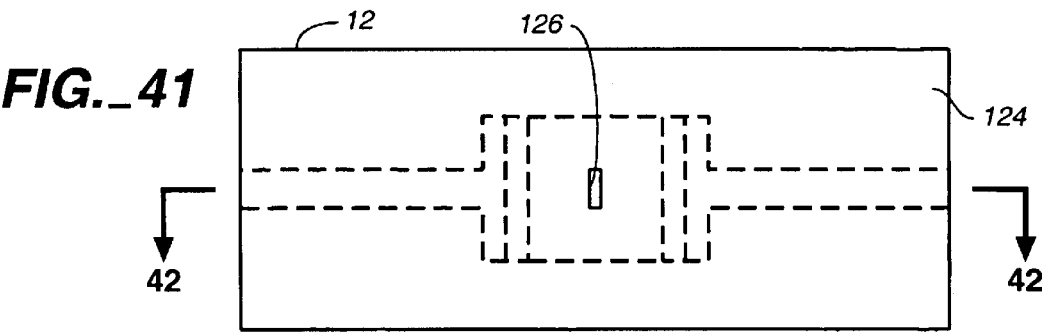
FIG._41
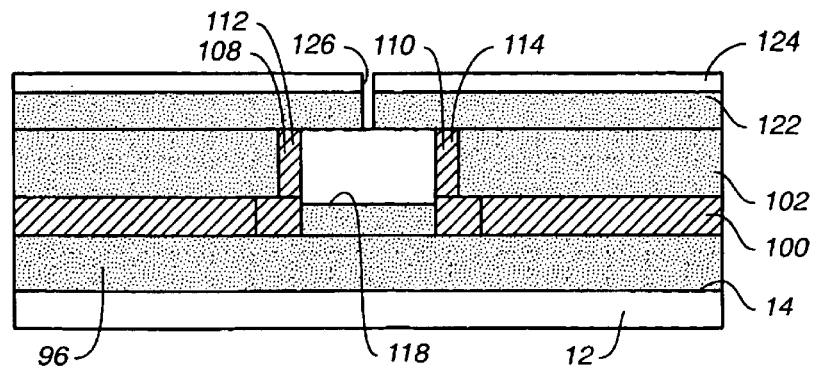
FIG._42

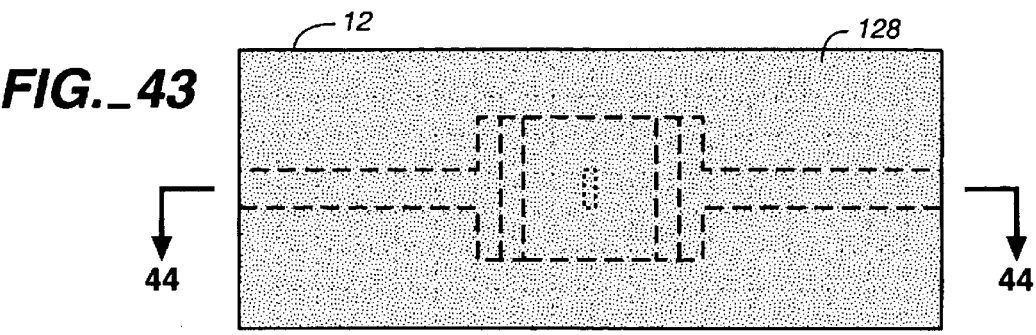
FIG._43
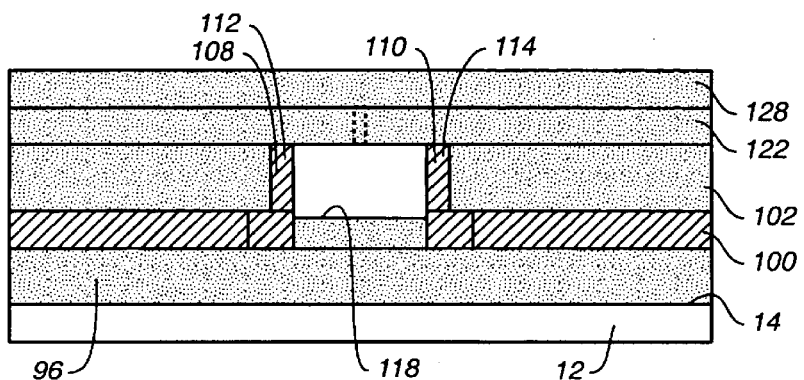
FIG._44
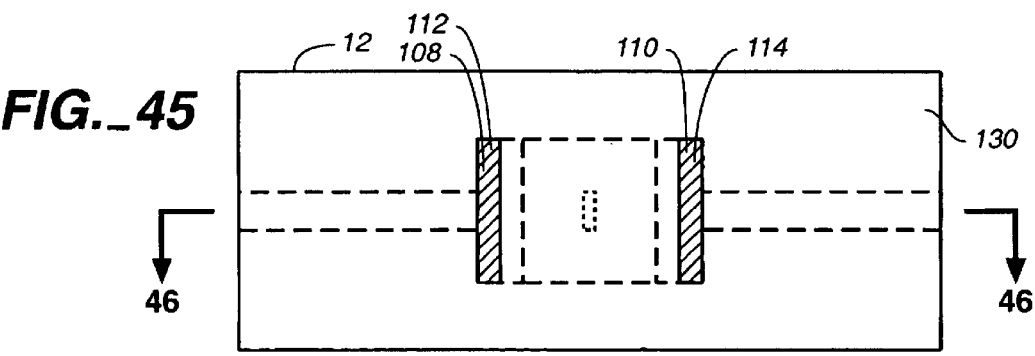
FIG._45
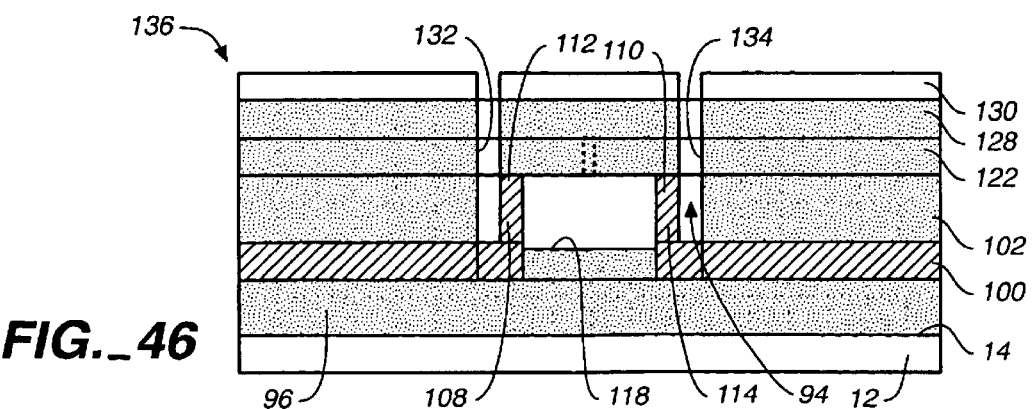
FIG._46

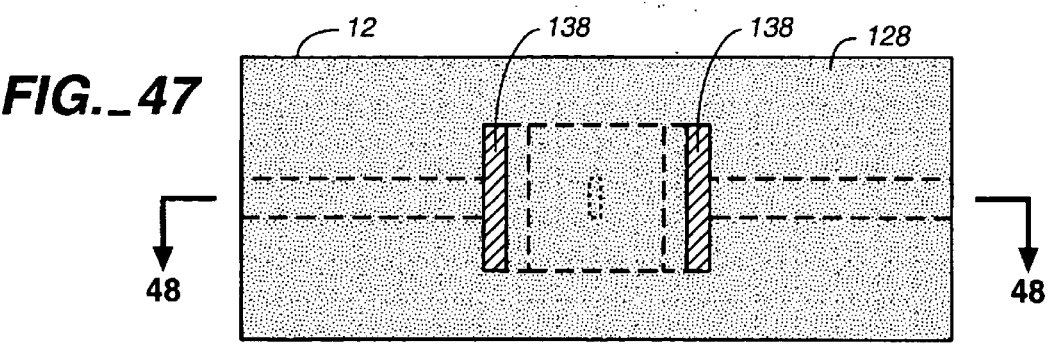
FIG._47
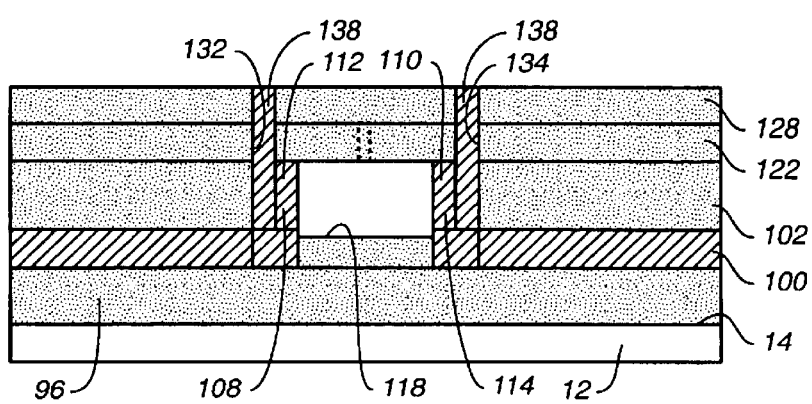
FIG._48
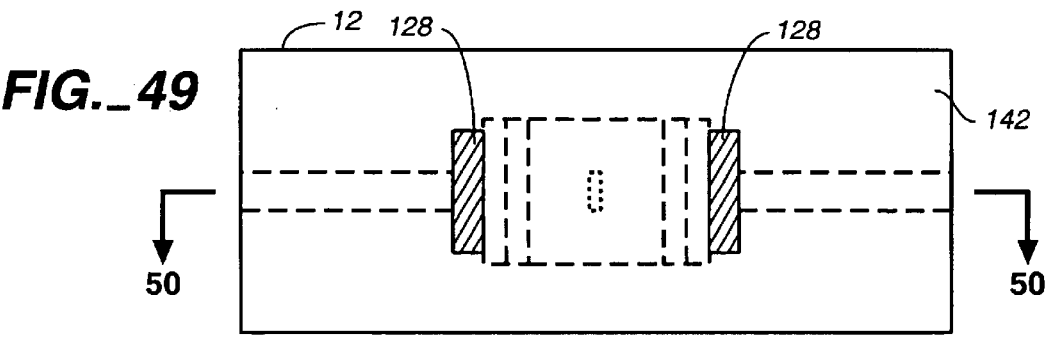
FIG._49
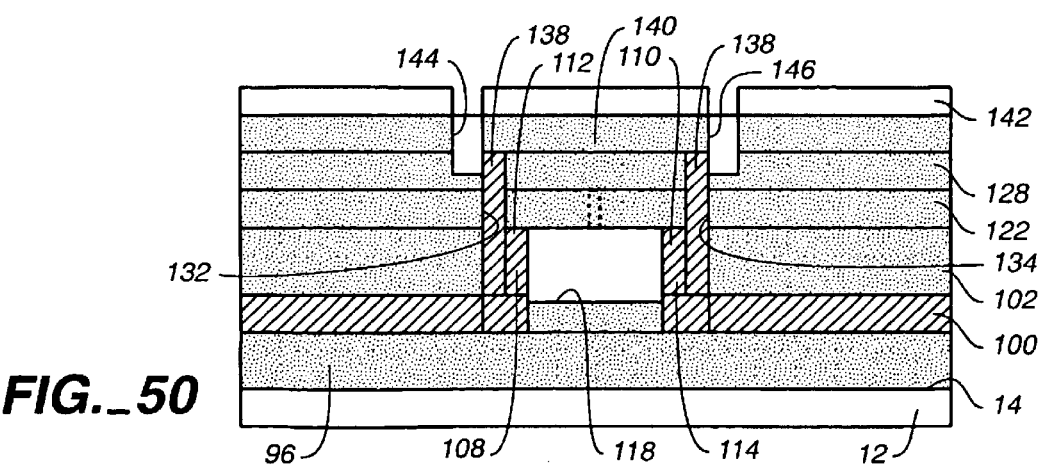
FIG._50

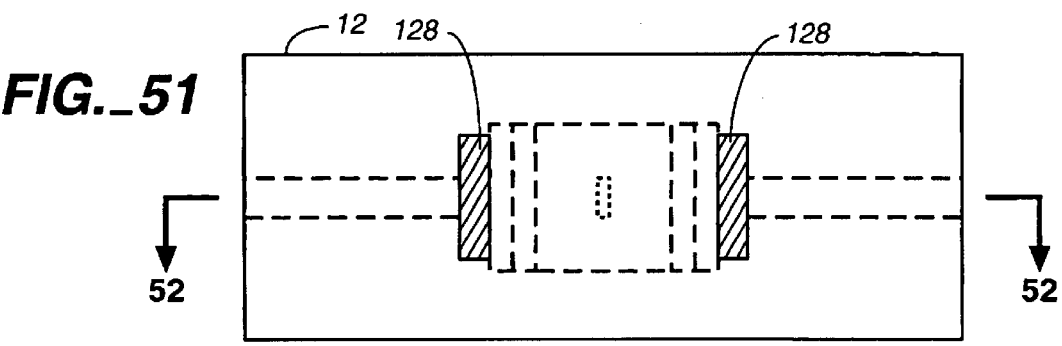
FIG._51
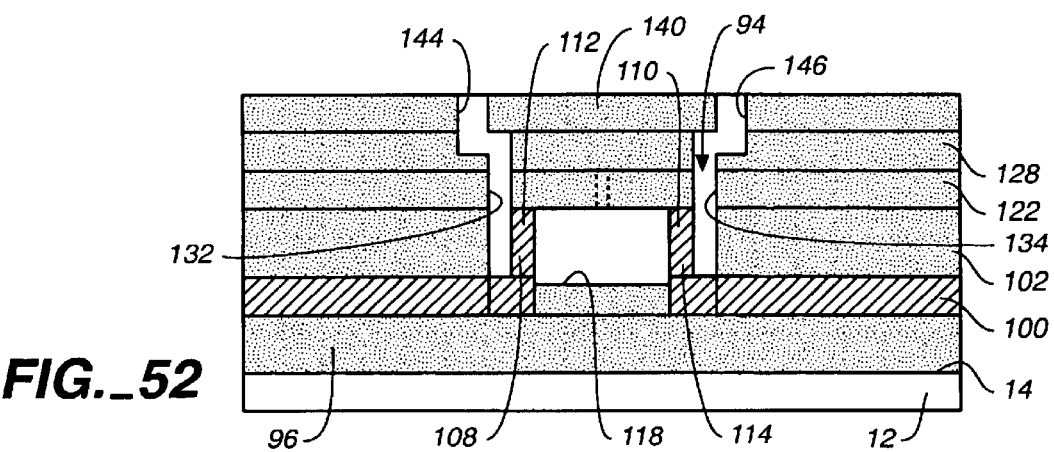
FIG._52

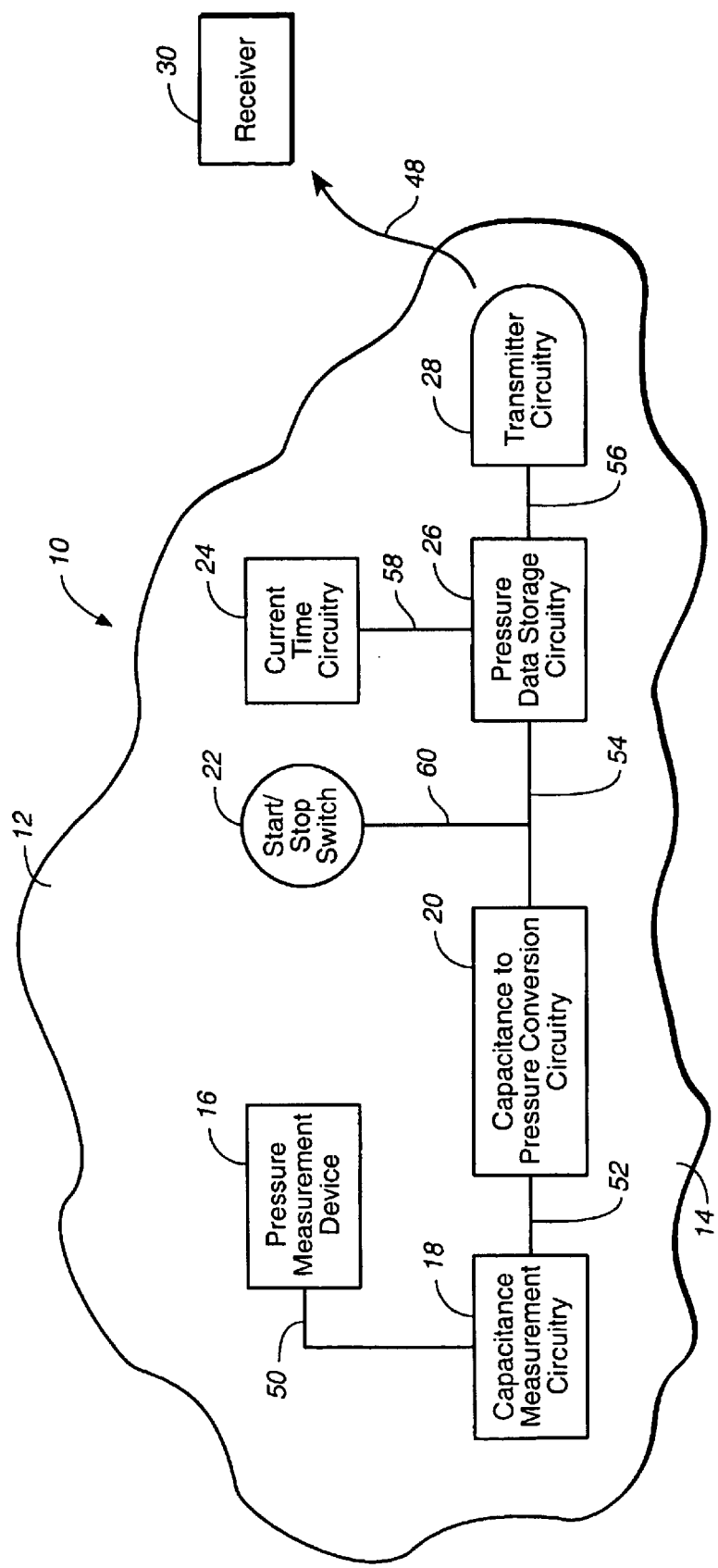
FIG._53

ARRANGEMENT FOR MEASURING PRESSURE ON A SEMICONDUCTOR WAFER AND AN ASSOCIATED METHOD FOR FABRICATING A SEMICONDUCTOR WAFER

TECHNICAL FIELD OF THE INVENTION

The present invention relates generally to semiconductor wafers, and more particularly to an arrangement for measuring pressure on a semiconductor wafer and an associated method for fabricating a semiconductor wafer.

BACKGROUND OF THE INVENTION

During their fabrication, semiconductor wafers are typically subjected to processing by a number of semiconductor wafer processing tools, e.g. a chemical mechanical planarization tool. The processing of semiconductor a wafers by these tools results in the semiconductor wafers being subjected to various pressures. It is important that the pressures the semiconductor wafers are subjected to be measured and controlled to ensure that they remain within certain predetermined limits.

One current method to measure the pressure that a semiconductor wafer is exposed to during its processing includes utilizing a pressure sensor positioned within a chamber of a semiconductor wafer processing tool. Generally this method involves (i) positioning a semiconductor wafer within the chamber of the semiconductor wafer processing tool, (ii) processing the semiconductor wafer within the chamber with the semiconductor wafer processing tool, and (iii) measuring the pressure within the chamber with the pressure sensor as the semiconductor is being processed. The pressure measured within the chamber of the semiconductor wafer processing tool is then assumed to be the same pressure the semiconductor wafer is subjected to during its processing.

One problem with the above described approach for measuring pressure is that it only measures the pressure at a specific point in the chamber, and does not measure the pressure at specific locations on the semiconductor wafer. This is a problem since, under certain conditions, the pressure in the chamber is not equal to the pressure experience by the semiconductor wafer. Another problem with the above described approach is that the data generated by the sensor in the chamber can not be utilized to produce a "pressure map" of the surface of the semiconductor wafer (i.e. the pressure experienced by the semiconductor wafer at specific locations across the surface thereof).

Thus, a continuing need exists for an arrangement for measuring pressure on a semiconductor wafer and an associated method for fabricating a semiconductor wafer which address one or more of the above described problems.

SUMMARY OF THE INVENTION

In accordance with one embodiment of the present invention, there is provided a semiconductor wafer. The semiconductor wafer includes a surface and a pressure measurement device supported on the surface of the semiconductor wafer.

In accordance with another embodiment of the present invention, there is provided an arrangement for measuring pressure. The arrangement includes a semiconductor wafer and a capacitor supported on the semiconductor wafer. The arrangement also includes capacitance measurement circuitry supported on the semiconductor wafer. The capacitance measurement circuitry is electrically coupled to the capacitor. The arrangement further includes capacitance to pressure conversion circuitry supported on the semiconductor wafer. The capacitance to pressure conversion circuitry is electrically coupled to the capacitance measurement circuitry.

In accordance with still another embodiment of the present invention, there is provided a method of fabricating a semiconductor wafer. The method includes (a) subjecting the semiconductor wafer to a pressure and (b) measuring the pressure the semiconductor wafer is subjected to with a pressure a measurement device supported on the semiconductor wafer.

It is an object of the present invention to provide a new and useful semiconductor wafer.

It is an object of the present invention to provide an improved semiconductor wafer.

It is also an object of the present invention to provide a new and useful arrangement for measuring pressure.

It is further an object of the present invention to provide an improved arrangement for measuring pressure.

It is also an object of the present invention to provide a new and useful method of fabricating a semiconductor wafer.

It is further an object of the present invention to provide an improved method of fabricating a semiconductor wafer.

The above and other objects, features, and advantages of the present invention will become apparent from the following description and the attached drawings.

BRIEF DESCRIPTION OF THE DRAWINGS

FIG. 1. is a top elevational view of a portion of a semiconductor wafer at a first time during fabrication of a pressure measurement device thereon;

FIG. 2 is a cross sectional view of taken along line 2—2 of FIG. 1, as viewed in the direction of the arrows;

FIG. 3 is a top elevational view of the portion of the semiconductor wafer shown in FIG. 1 at a second time during fabrication of the pressure measurement device thereon;

FIG. 4 is a cross sectional view of taken along line 4—4 of FIG. 3, as viewed in the direction of the arrows;

FIG. 5 is a top elevational view of the portion of the semiconductor wafer shown in FIG. 3 at a third time during fabrication of the pressure measurement device thereon;

FIG. 6 is a cross sectional view of taken along line 6—6 of FIG. 5, as viewed in the direction of the arrows;

FIG. 7 is a top elevational view of the portion of the semiconductor wafer shown in FIG. 5 at a fourth time during fabrication of the pressure measurement device thereon;

FIG. 8 is a cross sectional view of taken along line 8—8 of FIG. 7, as viewed in the direction of the arrows;

FIG. 9 is a top elevational view of the portion of the semiconductor wafer shown in FIG. 7 at a fifth time during fabrication of the pressure measurement device thereon;

FIG. 10 is a cross sectional view of taken along line 10—10 of FIG. 9, as viewed in the direction of the arrows;

FIG. 11 is a top elevational view of the portion of the semiconductor wafer shown in FIG. 9 at a sixth time during fabrication of the pressure measurement device thereon;

FIG. 12 is a cross sectional view of taken along line 12—12 of FIG. 11, as viewed in the direction of the arrows;

FIG. 13 is a top elevational view of the portion of the semiconductor wafer shown in FIG. 11 at a seventh time during fabrication of the pressure measurement device thereon;

FIG. 14 is a cross sectional view of taken along line 14—14 of FIG. 13, as viewed in the direction of the arrows;

FIG. 15 is a top elevational view of the portion of the semiconductor wafer shown in FIG. 13 at an eighth time during fabrication of the pressure measurement device thereon;

FIG. 16 is a cross sectional view of taken along line 16—16 of FIG. 15, as viewed in the direction of the arrows;

FIG. 17 is a top elevational view of the portion of the semiconductor wafer shown in FIG. 15 at a ninth time during fabrication of the pressure measurement device thereon;

FIG. 18 is a cross sectional view of taken along line 18—18 of FIG. 17, as viewed in the direction of the arrows;

FIG. 19 is a top elevational view of the portion of the semiconductor wafer shown in FIG. 17 at a tenth time during fabrication of the pressure measurement device thereon;

FIG. 20 is a cross sectional view of taken along line 20—20 of FIG. 19, as viewed in the direction of the arrows;

FIG. 21 is a top elevational view of the portion of the semiconductor wafer shown in FIG. 19 at an eleventh time during fabrication of the pressure measurement device thereon;

FIG. 22 is a cross sectional view of taken along line 22—22 of FIG. 21, as viewed in the direction of the arrows;

FIG. 23 is a top elevational view of the portion of the semiconductor wafer shown in FIG. 21 at a twelfth time during fabrication of the pressure measurement device thereon;

FIG. 24 is a cross sectional view of taken along line 24—24 of FIG. 23, as viewed in the direction of the arrows;

FIG. 25 is a top elevational view of the portion of the semiconductor wafer shown in FIG. 23 at a thirteenth time during fabrication of the pressure measurement device thereon;

FIG. 26 is a cross sectional view of taken along line 26—26 of FIG. 25, as viewed in the direction of the arrows;

FIG. 27 is a top elevational view of a portion of a semiconductor wafer at a first time during fabrication of a pressure measurement device thereon;

FIG. 28 is a cross sectional view of taken along line 28—28 of FIG. 27, as viewed in the direction of the arrows;

FIG. 29 is a top elevational view of the portion of the semiconductor wafer shown in FIG. 27 at a second time during fabrication of the pressure measurement device thereon;

FIG. 30 is a cross sectional view of taken along line 30—30 of FIG. 29, as viewed in the direction of the arrows;

FIG. 31 is a top elevational view of the portion of the semiconductor wafer shown in FIG. 29 at a third time during fabrication of the pressure measurement device thereon;

FIG. 32 is a cross sectional view of taken along line 32—32 of FIG. 31, as viewed in the direction of the arrows;

FIG. 33 is a top elevational view of the portion of the semiconductor wafer shown in FIG. 31 at a fourth time during fabrication of the pressure measurement device thereon;

FIG. 34 is a cross sectional view of taken along line 34—34 of FIG. 33, as viewed in the direction of the arrows;

FIG. 35 is a top elevational view of the portion of the semiconductor wafer shown in FIG. 33 at a fifth time during fabrication of the pressure measurement device thereon;

FIG. 36 is a cross sectional view of taken along line 36—36 of FIG. 35, as viewed in the direction of the arrows;

FIG. 37 is a top elevational view of the portion of the semiconductor wafer shown in FIG. 35 at a sixth time during fabrication of the pressure measurement device thereon;

FIG. 38 is a cross sectional view of taken along line 38—38 of FIG. 37, as viewed in the direction of the arrows;

FIG. 39 is a top elevational view of the portion of the semiconductor wafer shown in FIG. 37 at a seventh time during fabrication of the pressure measurement device thereon;

FIG. 40 is a cross sectional view of taken along line 40—40 of FIG. 39, as viewed in the direction of the arrows;

FIG. 41 is a top elevational view of the portion of the semiconductor wafer shown in FIG. 39 at an eighth time during fabrication of the pressure measurement device thereon;

FIG. 42 is a cross sectional view of taken along line 42—42 of FIG. 41, as viewed in the direction of the arrows;

FIG. 43 is a top elevational view of the portion of the semiconductor wafer shown in FIG. 41 at a ninth time during fabrication of the pressure measurement device thereon;

FIG. 44 is a cross sectional view of taken along line 44—44 of FIG. 43, as viewed in the direction of the arrows;

FIG. 45 is a top elevational view of the portion of the semiconductor wafer shown in FIG. 43 at a tenth time during fabrication of the pressure measurement device thereon;

FIG. 46 is a cross sectional view of taken along line 46—46 of FIG. 45, as viewed in the direction of the arrows;

FIG. 47 is a top elevational view of the portion of the semiconductor wafer shown in FIG. 45 at an eleventh time during fabrication of the pressure measurement device thereon;

FIG. 48 is a cross sectional view of taken along line 48—48 of FIG. 47, as viewed in the direction of the arrows;

FIG. 49 is a top elevational view of the portion of the semiconductor wafer shown in FIG. 47 at a twelfth time during fabrication of the pressure measurement device thereon;

FIG. 50 is a cross sectional view of taken along line 50—50 of FIG. 49, as viewed in the direction of the arrows;

FIG. 51 is a top elevational view of the portion of the semiconductor wafer shown in FIG. 49 at a thirteenth time during fabrication of the pressure measurement device thereon;

FIG. 52 is a cross sectional view of taken along line 52—52 of FIG. 51, as viewed in the direction of the arrows; and FIG. 53 is fragmentary schematic illustration of an surface of an arrangement for measuring pressure which incorporates the features of the present invention therein.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Now referring to FIG. 53, there is shown an exemplary embodiment of an arrangement 10 for measuring pressure which incorporates features of the present invention therein. In particular, as discussed in greater detail below, arrangement 10 is utilized to measure the pressure a semiconductor wafer 12 is subjected to during the processing thereof with a semiconductor wafer processing tool (e.g. a chemical mechanical planarization tool (not shown)). Arrangement 10 includes semiconductor wafer 12 (hereinafter referred to wafer 12), a pressure measurement device 16, capacitance measurement circuitry 18, capacitance pressure conversion circuitry 20, a start/stop switch 22, pressure data storage circuitry 26, current time circuitry 24, transmitter circuitry 28, and a receiver 30. It should be understood that pressure measurement device 16, capacitance measurement circuitry 18, capacitance pressure conversion circuitry 20, start/stop switch 22, pressure data storage circuitry 26, current time circuitry 24, transmitter circuitry 28, and receiver 30 are all positioned on and supported by wafer 12. For example, pressure measurement device 16, capacitance measurement circuitry 18, capacitance pressure conversion circuitry 20, start/stop switch 22, pressure data storage circuitry 26, current time circuitry 24, transmitter circuitry 28, and receiver 30 can all be positioned on and supported by a surface 14 of wafer 12.

Still referring to FIG. 53, pressure measurement device 16 is electrically coupled to capacitance measurement circuitry 18 via line 50. Capacitance measurement circuitry 18 is electrically coupled to capacitance to pressure a conversion circuitry 20 via line 52. Capacitance to pressure conversion circuitry 20 is electrically coupled to pressure data storage circuitry 26 via line 54. Pressure data storage circuitry 26 is electrically coupled to transmitter circuitry 28 via line 56. Current time circuitry 24 is electrically coupled to pressure data storage circuitry 26 via line 58. Start/stop switch 22 is electrically coupled to capacitance to pressure conversion circuitry 20 and pressure data storage circuitry 26 via lines 54 and 60. It should also be understood that pressure measurement device 16, capacitance measurement circuitry 18, capacitance pressure conversion circuitry 20, start/stop switch 22, pressure data storage circuitry 26, current time circuitry 24, transmitter circuitry 28 can all be operatively coupled to a power source (not shown) and a controller, such as a computer (not shown) in any appropriate well known manner. In addition, it should be understood that all of the above described circuitry can be readily made by one of ordinary skill in the art using C-MOS, bi-C-MOS, bi-polartransistors or other well known integrated circuitry devices and techniques, therefore a detailed description of the of the subject circuitry will not be set forth herein.

As shown in FIG. 26, pressure measurement device 16 can include a capacitor 46 having a metal plate 32 spaced apart from a metal plate 34 so as to create a void 36 interposed metal plate 32 and metal plate 34. The following discussion in conjunction with FIGS. 1–26 and FIGS. 27–52 describe two alternative exemplary methods of fabricating a capacitor on wafer 12. The materials used to fabricate the capacitor are indicated as follows in FIGS. 1–52: a dielectric, such as $SiO_2$, $Al_2O_3$ (Aluminum Oxide), Polymide, and Silicon Nitride $Si_3N_4$ is indicated by the pattern , a metal, such as copper, aluminum, titanium, titanium nitride, gold, and platinum is indicated by the pattern , a photo resist, such as a novolak resin based photo resist, is indicated by the pattern , a sacrificial material, such as paraffin, polyethylene, polypropylene, polyamide, iodine and sulfur is indicated by the pattern . The particular techniques and methods utlized for disposing and removing the below discussed layers of material on wafer 12, e.g. dual damascene and photolithography, are well known and well within the skills of one of ordinary skill in the art. Therefore, these techniques and methods will not be discussed in detail herein.

The following discussion in reference to FIGS. 1–26 describes a first exemplary method of fabricating a capacitor 46 (see FIGS. 20 and 26) on wafer 12. Referring now to FIGS. 1 and 2, a dielectric layer 62 is disposed upon surface 14 of wafer 12. In addition, the deposition and patterning (with a photo resist layer 66) of a metal layer 64 is performed upon dielectric layer 62. Also note that metal layer 64 will eventually serve as metal plate 34 of capacitor 46 (see FIGS. 20 and 26). As shown in FIGS. 3 and 4, photo resist layer 66 is removed and a dielectric layer 68 is deposited on dielectric layer 62 (with or without chemical mechanical planarization) such that metal layer 64 is interposed dielectric layer 62 and dielectric layer 68. Now referring to FIGS. 5 and 6, dielectric layer 68 is patterned with the use of a photo resist layer 70 and etched to form void 36 of capacitor 46 (see FIGS. 20 and 26). As shown in FIGS. 7 and 8, a sacrificial material layer 72 is deposited onto dielectric layer 68 such that a portion of the sacrificial material layer 72 fills void 36. As illustrated in FIGS. 9 and 10, an etch back or chemical mechanical planarization process would be used to remove substantially all of sacrificial material 72 that is not contained in void 36. Referring now to FIGS. 11 and 12, the deposition and patterning of a metal layer 74 is performed upon dielectric layer 68. Note that this results in a photo resist layer 76 being disposed on metal layer 74. Also note that metal layer 74 will eventually serve as metal plate 32 of capacitor 46. As Illustrated in FIGS. 13 and 14, a photo resist layer 78 is disposed on dielectric layer 68 such that a slot 80 is patterned and etched through dielectric layer 68. Note that slot 80 extends into void 36. Now referring to FIGS. 15 and 16, sacrificial material 72 is removed from void 36 via slot 80. For example, sacrificial material 72 can be removed from void 36 via slot 80 by (i) thermally decomposing sacrificial material 72 so that its byproducts would escape from slot 80, (ii) thermally melting sacrificial material 72 so that it wicks away through slot 80, (iii) thermally boiling sacrificial material 72 so that its vapors escape through slot 80, or (iv) etching away sacrificial material 72 by passing etching chemicals through slot 80. As shown in FIGS. 17 and 18, a dielectric layer 82 is deposited onto metal layer 74 and dielectric layer 68 such that slot 80 is sealed with dielectric layer 82, thereby sealing void 36. It should be understood that dielectric layer 82 is deposited in the above described manner under low pressure or vacuum conditions so that once slot 80 is sealed the space in void 36 Is substantially a vacuum or under low pressure. Referring now to FIGS. 19 and 20, dielectric layer 82 is patterned with a photo resist layer 84 and etched so as to expose metal plate 32.

At this point capacitor 46 is complete and includes metal plate 32, metal plate 34, and void 36 interposed metal plates 32 and 34. If required exposed metal plate 32 can be subjected to a metal etch so as to thin metal plate 32 and thereby tune the sensitivity of capacitor 46. Therefore, as discussed in greater detail below, capacitor 46 will function and cooperate with the previously mentioned circuitry in order to measure the pressure wafer 12 is subjected to for most applications.

However, for some applications or environments capacitor 46 needs to function in (e.g. a plasma environment), metal plate 32 will have to be protected from exposure to certain materials. The following discussion in conjunction with FIGS. 21–26 describe an exemplary method of protecting capacitor 46. Now referring to FIGS. 21 and 22, area 86 directly above metal plate 32 is filled with sacrificial material 88. Note that an etch back or a chemical mechanical planarization process would be used to remove any sacrificial material 88 not contained in area 86. As shown In FIGS. 23 and 24, a protective dielectric layer 38 is disposed onto dielectric layer 82 and sacrificial removal slots 90 are patterned with a photo resist layer 92 and etched into protective dielectric layer 38 and dielectric layer 82. As shown in FIGS. 25 and 26, sacrificial material 88 is then removed from area 86 via sacrificial removal slots 90. For example, sacrificial material 88 can be removed from area 86 via sacrificial removal slots 90 by (i) thermally decomposing sacrificial material 88 so that its byproducts would escape from sacrificial removal slots 90, (ii) thermally melting sacrificial material 88 so that it wicks away through sacrificial removal slots 90, (iii) thermally boiling sacrificial material 88 so that its vapors escape through sacrificial removal slots 90, or (iv) etching away sacrificial material 88 by passing etching chemicals through sacrificial removal slots 90. It should be appreciated that additional protective dielectric layers can be added in the same manner as described above until enough protection has been provided for capacitor 46. It should also be appreciated that a protective dielectric layer 38 protects metal plate 32 from being exposed to certain materials when wafer 12 is in certain environments (e.g. a plasma environment). However, sacrificial removal slots 90 serve as channels 40 defined in protective dielectric layer 38 so that the channels 40 are in fluid communication with an exterior surface 42 of metal plate 32 and an area 44 external to channels 40. Accordingly, metal plate 32 is exposed to the pressure wafer 12 is subjected to.

The following discussion in reference to FIGS. 27–52 describes a second exemplary method of fabricating a capacitor 94 (see FIGS. 46 and 52) on wafer 12. Referring now to FIGS. 27 and 28, a dielectric layer 96 is disposed upon surface 14 of wafer 12. In addition, the deposition and patterning (with a photo resist layer 98) of a metal layer 100 is performed upon dielectric layer 96. As shown in FIGS. 29 and 30, a dielectric layer 102 is deposited on dielectric layer 96 and metal layer 100. Note that dielectric layer 102 can be deposited with or without subsequent chemical mechanical planarization. Now referring to FIGS. 31 and 32, dielectric layer 102 is patterned with a photo resist layer 104 and then etched to form plate spaces 106. As shown in FIGS. 33 and 34, one plate space 106 is filled with a metal layer 108 while the other plate space 106 is filled With a metal layer 110 with a subsequent etch back or chemical mechanical planarzation of the surface metal. Note that metal layer 108 will serve as metal plate 112 of capacitor 94 (see FIGS. 46 and 52), while metal layer 110 will serve as metal plate 114 of capacitor 94. Now referring to FIGS. 35 and 36, dielectric layer 102 is patterned with a photo resist layer 116 and a portion of dielectric layer 102 interposed between metal layer 108 and metal layer 110 is etched away to form a void 118. As illustrated in FIGS. 37 and 38, void 118 is filled with a sacrificial material 120. Note that an etch back or chemical mechanical planarization process can be utilized to remove any sacrificial material 120 not contained in void 118. Now referring to FIGS. 39 and 40, a dielectric layer 122 is deposited on sacrificial material 120 and dielectric layer 102. As shown in FIGS. 41 and 42, a photo resist layer 124 is patterned on dielectric layer 122 and a sacrificial removal slot 126 etched in dielectric layer 122 such that sacrificial removal slot 126 is in fluid communication with void 118. Sacrificial material 120 is removed from void 118 via a sacrificial removal slot 126. For example, sacrificial material 120 can be removed from void 118 via a sacrificial removal slot 126 by (i) thermally decomposing sacrificial material 118 so that its byproducts would escape from a sacrificial removal slot 126, (ii) thermally melting sacrificial material 120 so that it wicks away through a sacrificial removal slot 126, (iii) thermally boiling sacrificial material 120 so that its vapors escape through a sacrificial removal slot 126, or (iv) etching away sacrificial material 120 by passing etching chemicals through a sacrificial removal slot 126. As shown in FIGS. 43 and 44, a dielectric layer 128 is deposited onto dielectric layer 122 such that sacrificial removal slot 126 is sealed with dielectric layer 128, thereby sealing void 118. It should be understood that dielectric layer 128 is deposited in the above described manner under low pressure or vacuum conditions so that once sacrificial removal slot 126 is sealed the space in void 118 is substantially a vacuum or under low pressure. Now referring to FIGS. 45 and 46, dielectric layer 128 is patterned with a photo resist layer 130 and etched so that channels 132 and 134 are in fluid communication with (i) metal plate 112 and an area 136 exterior to channels 132 and 134 and (ii) metal plate 114 and area 136 exterior to channels 132 and 134, respectively.

At this point capacitor 94 is complete and includes metal plate 112, metal plate 114, and void 118 interposed metal plates 112 and 114. If required exposed metal plates 112 and 114 can be subjected to a metal etch so as to thin them and thereby tune the sensitivity of capacitor 94. Therefore, as discussed in greater detail below, capacitor 94 will function and cooperate with the previously mentioned circuitry in order to measure the pressure wafer 12 is subjected to for most applications.

However, as previously mentioned, for some applications or environments capacitor 94 needs to function in (e.g. a plasma environment), metal plates 112 and 114 will have to be protected from being exposed to certain materials. The following discussion in conjunction with FIGS. 47–52 describe an exemplary method of protecting capacitor 94. Now referring to FIGS. 47 and 48, channels 132 and 134 are filled with a sacrificial material 138. An etch back or chemical mechanical planarization process can be used to remove any sacrificial material 138 not contained within channels 132 or 134. As shown in FIGS. 49 and 50, a protective dielectric layer 140 is deposited onto dielectric layer 128. Protective dielectric layer 140 is patterned with a photo resist layer 142 and sacrificial removal slots 144 and 146 are etched such that sacrificial removal slots 144 and 146 are in fluid communication with sacrificial material 138. Now referring to FIGS. 51 and 52, sacrificial material 138 is then removed from channels 132 and 134 in the same manner as described above, i.e. by (i) thermally decomposing sacrificial material 138 so that its byproducts would escape from sacrificial removal slots 144 and 146, (ii) thermally melting sacrificial material 138 so that it wicks away through sacrificial removal slots 144 and 146, (iii) thermally boiling sacrificial material 138 so that its vapors escape through sacrificial removal slots 144 and 146, or (iv) etching away sacrificial material 138 by passing etching chemicals through sacrificial removal slots 144 and 146. It should be appreciated that additional protective dielectric layers can be added in the same manner as described above until enough protection has been provided for capacitor 94.

As previously indicated, protective dielectric layer 140 protects metal plates 112 and 114 from being exposed to certain materials when wafer 12 is in certain environments (e.g. a plasma environment). However, sacrificial removal slots 144 and 146 along with channels 132 and 134 keep metal plates 112 and 114 in fluid communication with the area exterior to these slots and channels so that metal plates 112 and 114 are also subjected to the pressures wafer 12 is subjected to.

During use of arrangement 10, wafer 12 is subjected to processing by a semiconductor wafer processing tool (not shown). During the processing, wafer 12 is exposed to pressures. The above described metal plates (i.e. metal plates 112 and 114 of capacitor 94 and metal plates 32 and 34 of capacitor 46) are sufficiently thin so that the pressures wafer 12 is exposed to distorts the metal plates and thereby causes the distance between the metal plates to change. For example, as shown in FIG. 26, metal plates 32 and 34 of capacitor 46 are spaced apart from each other by a distance $D_1$. However, when wafer 12 having capacitor 46 disposed thereon, is exposed to a pressure, for example, in a chamber of semiconductor wafer processing tool, the pressure is communicated to metal plate 32 via sacrificial removal slots 90. This pressure then distorts metal plate 32 such that the distance $D_1$ metal plate 32 is spaced apart from metal plate 34 changes. Accordingly, metal plates 32 and 34 are now spaced apart from each other by a distance $D_2$ which is different from distance $D_1$. Changing the distance metal plates 32 and 34 are separated by changes the capacitance of capacitor 46 which is measured by capacitance measurement circuitry 18 (see FIG. 53). The capacitance measured by capacitance measurement circuitry 18 is then converted to a correlated pressure by capacitance to pressure conversion circuitry 20. The correlated pressure is then stored in pressure data storage circuitry 26 for later retrieval, e.g. by a controller, such as a computer, or if real time pressure data is desired, transmitted to receiver 30. via a signal 48 (see FIG. 53) indicative of the pressure by transmitter circuitry 28. It should also be understood that any pressure data collected can be associated with current time data via current time circuitry 24. Associating pressure data with current time data allows an operator of a semiconductor wafer processing tool to correlate a particular pressure with a particular process which was being performed by the semiconductor wafer tool at a specific time. Furthermore, arrangement 10 can be activated or deactivated via start/stop switch 22.

In light of the above discussion it should be appreciated that present invention has several advantages, including (i) the ability to actually measure pressure on the wafer rather than just the pressure within the chamber the wafer is being processed in, (ii) the ability to protect the pressure measurement device from plasmas so the pressure measurement device can function in the presence of plasma, (iii) the ability to measure the pressure on a wafer during the deposition of films or layers on the wafer, (iv) the ability to measure the pressure the wafer is subjected to during all movements of the wafer in a semiconductor wafer processing tool, and (v) the ability to generate a pressure map across the surface of a wafer by placing an array of pressure measurement devices across the surface of the wafer.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

What is claimed is:

1. A method of fabricating a semiconductor wafer, comprising:
    (a) subjecting said semiconductor wafer to a pressure; and
    (b) measuring said pressure said semiconductor is subjected to with a pressure measurement device supported on said semiconductor wafer, said pressure measurement device including (i) a capacitor, (ii) capacitance measurement circuitry electrically coupled to said capacitor, and (iii) capacitance to pressure conversion circuitry electrically coupled to said capacitance measurement circuitry and further including converting a capacitance of said capacitor to a pressure with said capacitance to pressure conversion circuitry.

2. The method of claim 1, wherein said pressure measurement device includes capacitance to pressure conversion circuitry, said method further comprising:
    (c) storing said pressure in pressure data storage circuitry supported on said semiconductor wafer, said pressure data storage circuitry being electrically coupled to said capacitance to pressure conversion circuitry.

3. The method of claim 1, wherein said pressure measurement device includes capacitance to pressure conversion circuitry, said method further comprising:
    (c) transmitting a signal indicative of said pressure to a receiver with transmitter circuitry which is (i) electrically coupled to said capacitance to pressure conversion circuitry and (ii) supported on said semiconductor wafer.

4. The method of claim 2, further comprising:
    (d) associating said pressure stored in said pressure data storage circuitry with current time via current time circuitry supported on said semiconductor wafer, said pressure data storage circuitry being electrically coupled to said current time circuitry.

5. The method of claim 4, further comprising:
    (c) activating said pressure measurement device via a switch supported on said semiconductor wafer.

6. The method of claim 1, further comprising:
    (d) deactivating said arrangement via said switch.

7. The method of claim 6, further comprising:
    (c) activating said pressure measurement device via a switch supported on said semiconductor wafer.

8. The method of claim 1, further comprising, before step (a), forming said capacitor on the semiconductor by fabricating first and second metal plates on the semiconductor, the first and second metal plates separated by a void.

9. The method of claim 8 wherein forming the capacitor on the semiconductor further comprises supporting a protecting layer on the semiconductor wafer so that the capacitor is interposed between said protective layer and said semiconductor wafer.

10. The method of claim 1, further comprising:
    (a) forming a capacitor on the semiconductor by fabricating first and second metal plates on the semiconductor wafer, the first and second metal plates separated by a void;
    (b) subjecting said semiconductor wafer to a pressure; and
    (c) measuring said pressure said semiconductor wafer is subjected to using the capacitor.

11. The method of claim 10 wherein forming the capacitor on the semiconductor further comprises supporting a protecting layer on the semiconductor wafer so that the capacitor is interposed between said protective layer and said semiconductor wafer.

* * * * *